United States Patent
Cairns et al.

(10) Patent No.: US 8,557,729 B2
(45) Date of Patent: *Oct. 15, 2013

(54) SHAPED HETEROGENEOUS CATALYSTS

(75) Inventors: Daniel Lee Cairns, Durham (GB); Mileta Babovic, Newcastle upon Tyne (GB); Terence James Fitzpatrick, Stockton-on-Tees (GB); Elizabeth Margaret Holt, Stockton-on-Tees (GB); Colin William Park, Darlington (GB); William Maurice Sengelow, Billingham (GB); Edmund Hugh Stitt, Billingham (GB)

(73) Assignee: Johnson Matthey PLC, London (GB)

( * ) Notice: Subject to any disclaimer, the term of this patent is extended or adjusted under 35 U.S.C. 154(b) by 303 days.

This patent is subject to a terminal disclaimer.

(21) Appl. No.: 13/063,633

(22) PCT Filed: Aug. 24, 2009

(86) PCT No.: PCT/GB2009/051053
§ 371 (c)(1),
(2), (4) Date: Mar. 11, 2011

(87) PCT Pub. No.: WO2010/029325
PCT Pub. Date: Mar. 18, 2010

(65) Prior Publication Data
US 2011/0166013 A1 Jul. 7, 2011

(30) Foreign Application Priority Data
Sep. 12, 2008 (GB) .................. 0816709.0

(51) Int. Cl.
| | | |
|---|---|---|
| B01J 21/18 | (2006.01) |
| B01J 27/236 | (2006.01) |
| B01J 23/00 | (2006.01) |
| B01J 23/10 | (2006.01) |
| B01J 23/40 | (2006.01) |
| B01J 23/42 | (2006.01) |
| B01J 23/56 | (2006.01) |
| B01J 23/58 | (2006.01) |
| B01J 23/02 | (2006.01) |
| B01J 23/08 | (2006.01) |
| B01J 21/04 | (2006.01) |
| C10G 35/00 | (2006.01) |
| C10G 45/00 | (2006.01) |
| C10G 17/00 | (2006.01) |
| C01B 21/00 | (2006.01) |
| C01C 1/00 | (2006.01) |
| C07C 27/00 | (2006.01) |
| C07C 27/06 | (2006.01) |

(52) U.S. Cl.
USPC ........... 502/170; 502/174; 502/176; 502/300; 502/304; 502/305; 502/306; 502/308; 502/311; 502/313; 502/317; 502/319; 502/321; 502/323; 502/324; 502/325; 502/326; 502/330; 502/332; 502/340; 502/344; 502/349; 502/355; 502/439; 502/527.14; 502/527.18; 502/527.19; 264/15; 264/629; 264/681; 518/700; 518/713; 518/714; 518/715

(58) Field of Classification Search
USPC ......... 502/170, 174, 176, 300, 305–355, 439, 502/527.14, 527.18, 527.19; 264/15, 629, 264/681
See application file for complete search history.

(56) References Cited

U.S. PATENT DOCUMENTS

| | | | | |
|---|---|---|---|---|
| 2,212,932 | A | * | 8/1940 | Fairlie ............................ 261/94 |
| 2,408,164 | A | | 9/1946 | Foster |
| 3,764,565 | A | | 10/1973 | Jacobs |
| 4,328,130 | A | | 5/1982 | Kyan |
| 4,394,303 | A | | 7/1983 | Gibson |
| 4,402,870 | A | * | 9/1983 | Schurmans ................... 502/439 |
| 4,441,990 | A | | 4/1984 | Huang |
| 4,517,077 | A | | 5/1985 | Clements |
| 4,656,157 | A | | 4/1987 | Hofmann |
| 6,005,121 | A | | 12/1999 | Ebner |
| 6,518,220 | B2 | * | 2/2003 | Walsdorff et al. ............ 502/346 |
| 7,351,393 | B1 | | 4/2008 | Bayense |
| 7,799,730 | B2 | | 9/2010 | Ringer |

| | | |
|---|---|---|
| 2001/0029235 A1 | 10/2001 | Walsdorff |
| 2004/0043900 A1* | 3/2004 | Combs .......................... 502/439 |
| 2007/0032680 A1* | 2/2007 | Felder et al. .................. 562/535 |
| 2012/0171407 A1* | 7/2012 | Richard et al. .................. 428/80 |

FOREIGN PATENT DOCUMENTS

| | | |
|---|---|---|
| CA | 1194012 | 9/1985 |
| CN | 2388204 Y | 7/2000 |
| CN | 2684922 | 3/2005 |
| CN | 2686721 Y | 3/2005 |
| CN | 1213808 | 8/2005 |
| EP | 0220933 | 5/1987 |
| EP | 0464633 | 1/1992 |
| EP | 591572 | 4/1994 |
| EP | 0998976 | 5/2000 |
| EP | 1792651 | 6/2007 |
| GB | 893987 | 4/1962 |
| SU | 957948 | 9/1982 |
| WO | 9301155 | 1/1993 |
| WO | 02087756 | 11/2002 |
| WO | 03013725 | 2/2003 |
| WO | 2004014549 | 2/2004 |
| WO | 2006114320 | 11/2006 |
| WO | 2008087149 | 7/2008 |

OTHER PUBLICATIONS

International Search Report for PCT/GB2009/051053 dated Dec. 4, 2009.

* cited by examiner

*Primary Examiner* — Patricia L Hailey

(74) *Attorney, Agent, or Firm* — RatnerPrestia

(57) ABSTRACT

A catalyst unit is described in the form of a cylinder having a length C and diameter D, which has two or more flutes running along its length, wherein said cylinder has domed ends of lengths A and B, such that (A+B+C)/D is in the range 0.50 to 2.00, and (A+B)/C is in the range 0.40 to 5.00. The catalyst may be used particularly in reactions where hydrogen is a reactant such as hydroprocessing, hydrogenation, water-gas shift reactions, methanation, hydrocarbon synthesis by the Fischer-Tropsch reaction, methanol synthesis and ammonia synthesis.

26 Claims, 1 Drawing Sheet

SHAPED HETEROGENEOUS CATALYSTS

CROSS-REFERENCE TO RELATED APPLICATIONS

This application is the U.S. National Phase application of PCT International Application No. PCT/GB2009/051053, filed Aug. 24, 2009, and claims priority of British Patent Application No. 0816709.0, filed Sep. 12, 2008, the disclosures of both of which are incorporated herein by reference in their entirety for all purposes.

FIELD OF THE INVENTION

This invention relates to shaped heterogeneous catalysts.

BACKGROUND OF THE INVENTION OF THE INVENTION

Heterogeneous catalysts are typically provided as particulate beds through which a liquid and/or gaseous reactant mixture is passed, often at elevated temperature and pressure. Therefore heterogeneous catalytic materials are often provided in shaped form to provide a balance of catalytic activity and throughput. In general smaller catalyst particles have a higher surface area and therefore activity, but provide lower throughput because the pressure drop through the catalyst bed is higher. To counter this, various catalyst designs have been used, which may have one or more flutes or channels running along the exterior surface in an attempt to increase the geometric surface area while minimise pressure drop.

U.S. Pat. No. 4,328,130 discloses a shaped catalyst in the form of a cylinder with a plurality of longitudinal channels extending radially from the circumference of the cylinder and defining protrusions therebetween, wherein the protrusions have a maximum width greater than the maximum width of the channels. The catalysts depicted have 2, 3 or 4 truncated-V shaped channels.

WO 2004/014549 discloses shaped heterogeneous catalysts for gaseous reactions, comprising a cylindrical unit having a diameter to height ratio in the range between about 0.5:1 to 1:1 and having a plurality of shaped holes of non-circular cross-section therethrough. Some embodiments additionally have two, three or four V-shaped flutes or channels running along the external length of the cylinder.

SUMMARY OF THE INVENTION

Whereas flutes or holes may increase the theoretical geometric surface area, we have found that the effective geometric surface area when the units are placed in a packed bed can be significantly reduced by the packing of the catalyst. We have designed catalyst units that overcome the problems associated with such designs.

Accordingly the invention provides a catalyst unit in the form of a cylinder having a length C and diameter D, wherein the exterior surface of the unit has two or more flutes running along its length, said cylinder having domed ends of lengths A and B such that (A+B+C)/D is in the range 0.50 to 2.00, and (A+B)/C is in the range 0.40 to 5.00.

The invention further provides a method of making a catalyst unit comprising the steps of (i) feeding a powdered material, optionally with a pelleting aid, into a pelleting die, (ii) compressing the powder to form a shaped unit and then (iii) optionally heating the shaped unit to form the catalyst unit, said die being shaped such that the catalyst unit is in the form of a cylinder having a length C and diameter D, wherein the exterior surface of the unit has two or more flutes running along its length, said cylinder having domed ends of lengths A and B such that (A+B+C)/D is in the range 0.50 to 2.00, and (A+B)/C is in the range 0.40 to 5.00.

The invention further provides a catalytic process using the catalyst unit by contacting a reactant mixture with the catalyst unit under conditions to effect the catalysed reaction.

DETAILED DESCRIPTION OF THE INVENTION

Figure 1:
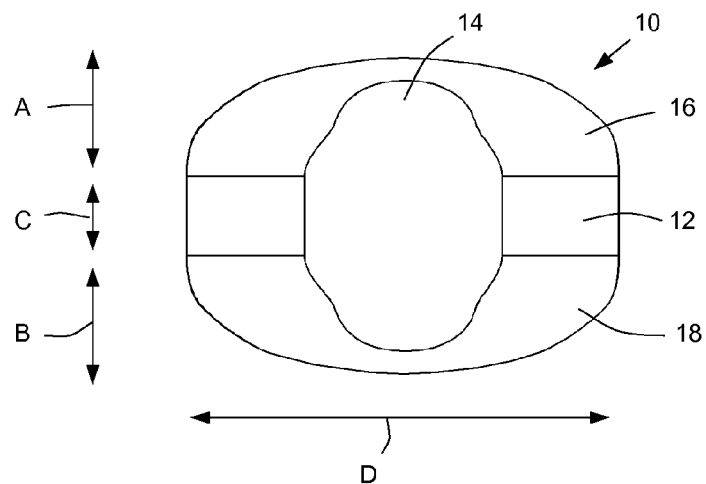
FIG. 1 is a side view depiction of a catalyst unit according to the present invention.

We have found that fluted catalyst units of the present invention that have these proportions, where the domed ends are relatively increased in size, provide a greater effective geometric surface area than prior art catalysts.

The aspect ratio of the catalyst unit, which may be defined as overall length divided by the diameter, i.e. (A+B+C)/D is in the range 0.5 to 2.0. Preferably (A+B+C)/D is in the range 0.50 to 1.50 as this reduces the tendency of the unit to break.

One or both ends of the cylinder, preferably both ends, are domed. The domed ends have lengths A and B, which may be the same or different. Asymmetric domed ends, i.e. where A and B are different, may offer advantages in manufacture. Furthermore, asymmetric domed ends may improve the surface area/voidage relationship. The dome ratio to the cylindrical part of the catalyst unit (i.e. (A+B)/C) is in the range 0.40 to 5.00, so as to provide a relatively highly domed structure. Preferably (A+B)/C is in the range 0.40 to 3.00, more preferably 0.50 to 2.50. The domed ends may form a segment of a circle or ellipse in cross-section, and desirably have a radius R≥D/2.

For the majority of catalytic uses, C is preferably in the range 1 to 25 mm and D is preferably in the range 4 to 40 mm.

The catalyst unit has two or more flutes running along its length. In the present invention, the words "flute" and "channel" may be used interchangeably. The flutes may be curved or straight or a combination thereof. Preferably the flutes are straight and run axially along the exterior of the catalyst unit as this simplifies fabrication. The shape of the flutes may be semicircular, elliptical, U-shaped, V-shaped, Π-shaped or a variant of these.

The catalyst unit may have between 2 and 12 or more flutes, which desirably are symmetrically positioned, i.e. equally spaced around the circumference of the catalyst unit. 2-7 flutes, particularly 3, 4 or 5 flutes or channels are preferred. Where the flutes are semi-circular or elliptical they may independently have a diameter d", width or depth in the range of 0.05 D to 0.5 D, preferably 0.15 D to 0.4 D. We have found particularly that it is desirable to limit the total flute width, i.e. the combined opening, to ≤35% of the circumference of the unit, i.e. ≤0.35 (☐D), as this prevents undesirable interlocking of adjacent units in a catalyst bed. Interlocking can reduce flow but also can give rise to broken catalyst due to leverage.

In a preferred embodiment, the flutes have rounded edges. This reduces interlocking and removes sharp edges that may otherwise be susceptible to attrition. Both interlocking and attrition give rise to the formation of fines and/or broken catalyst units that reduce the effectiveness of the catalyst and increase pressure drop through the catalyst bed. Preferably the rounded edges have a radius in the range 0.03 D to 0.09 D.

The catalyst units having the combination of a highly domed end or ends and a plurality of flutes provide improved geometric surface area and voidage to previous catalysts. If desired, the catalyst unit may also have one or more holes extending axially therethrough. The unit may have between 1 and 12 holes extending therethrough, more preferably 1-10 holes, particularly 1-6 holes. The holes should desirably be equally spaced and symmetrically positioned about the cross section of the cylinder so as to maximise the resulting strength of the catalyst. Thus 1-hole may be centrally positioned, 3 holes may be in a triangular pattern, 4 holes may be in a square pattern, 5 holes in a square pattern with a central hole, 6 holes may be in a hexagon pattern, and so on. Where $D \leq 6$ mm, 1 centrally positioned hole is preferred. Where there is more than one hole, they should be positioned in the lobes created between the flutes or channels. Central holes in multi-holed units are less preferred because this can reduce the strength of the unit. The holes may be circular in cross-section or have one or more of the variety of cross-sections disclosed in the aforesaid WO 2004/014549. In a preferred embodiment, the hole or holes are circular in cross-section. The holes may be the same size or different sizes. Preferably hole or holes have a circular cross-section and independently have a diameter d' in the range of 0.05 D to 0.5 D, more preferably 0.15 D to 0.3 D. However holes are not necessary in the present invention.

In order to assist in the fabrication process, one or both domed ends may be positioned to provide a lip on one or both ends of the cylinder portion of the shaped unit. The width, w', of the lip is desirably in the range 0.2 to 2.0 mm.

The catalyst units may be fabricated from a powdered composition containing one or more catalytically active metals thereby generating the catalyst directly or may fabricated from one or more powdered catalyst support materials and the resulting unit then treated e.g. by impregnation or deposition with one or more metal compounds to form the catalyst.

The catalyst unit may be fabricated using a powdered metal, metal oxide, metal hydroxide, metal carbonate, metal hydroxycarbonate or mixture thereof.

Powdered compositions containing catalytically active metals may be prepared by mixing the respective metal oxides, carbonates, hydroxides or hydroxy-carbonates, or may be formed by known precipitation techniques, whereby a mixture of soluble salts is precipitated, e.g. using an alkaline precipitating agent, dried and optionally calcined and/or reduced & passivated.

Preferred catalyst support materials are selected from powdered alumina, silica, titania, zirconia, metal-aluminate, or a mixture thereof, which may contain one or more stabilising compounds. Catalyst units fabricated with these may be termed shaped catalyst support units, and the final catalyst will therefore further comprise one or more metal compounds that have been impregnated into and/or deposited on said shaped catalyst support unit.

The catalyst units preferably comprise one or more metals selected from Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, or Ce.

The catalyst units may be fabricated using any of the known catalyst formulations using established methods.

In one embodiment, the catalyst unit comprises one or more transition metals such as nickel, cobalt, iron or copper, and/or one or more precious metals such as platinum, palladium, rhodium iridium or ruthenium that are present in the form of the metal, an oxide, hydroxide, carbonate or hydroxycarbonate.

In an alternative embodiment, the catalyst unit comprises one or more transition metals, such as nickel, copper, cobalt or iron and/or precious metals such as platinum, palladium, rhodium iridium or ruthenium, that have been impregnated into or deposited on a refractory catalyst support material such as an alumina-, calcium aluminate-, magnesium aluminate- or zirconia-based shaped catalyst support unit.

The transition metal and precious metal content in such catalysts may be up to 85% by weight, but is preferably in the range 1-60% by weight.

Pelleting is the preferred fabrication method for the present invention. The method for fabricating the catalyst unit may therefore comprise the steps of (i) feeding a powdered material, optionally with a pelleting aid or lubricant such as graphite or magnesium stearate, into a pelleting die, (ii) compressing the powder to form a shaped unit and then (iii) optionally heating the shaped unit to form the catalyst unit. The optional heating step, which may include calcination, may be performed to increase the strength of the catalyst unit. The powdered material may comprise one or more catalytically active metals in a reduced and/or oxidised form, or may be a catalyst support material, in which case the final catalyst may be prepared by a separate step of impregnating a metal compound into and/or depositing a metal compound onto the shaped catalyst support unit. Known techniques may be applied in order to do this. For example, in one embodiment, a solution of nickel nitrate may be impregnated into the shaped catalyst support unit, dried, and calcined to cause the nickel nitrate to decompose thereby forming a nickel oxide-containing catalyst. Alternatively, the powdered material may be a precipitated composition comprising one or more catalytic metals that has been dried and optionally calcined and/or reduced & passivated.

Alternative fabrication methods may be used, such as injection moulding, or possibly a two-step procedure of extrusion to form shaped extrudates, followed by forming domes on the extrudates.

The catalyst units containing the catalytic metal compounds may be subjected to various treatments such as reduction with a hydrogen- and/or carbon monoxide-containing gas stream or sulphidation, e.g. with hydrogen sulphide, to render them active in use. The post treatment may be carried out ex-situ or in-situ, i.e. before or after installation in the reactor where it is to be used.

The catalyst unit prepared according to the present invention may be applied to any heterogeneous catalytic process, but is preferably applied to fixed bed processes, more preferably fixed bed processes using gaseous reactants. The catalytic process therefore comprises contacting a reactant mixture, preferably a gaseous reactant mixture, with the catalyst under conditions to effect the catalysed reaction. The catalytic process may be selected from hydroprocessing including hydrodesulphurisation, hydrogenation, steam reforming including pre-reforming, catalytic steam reforming, autothermal reforming and secondary reforming and reforming processes used for the direct reduction of iron, catalytic partial oxidation, water-gas shift including isothermal-shift, sour shift, low-temperature shift, intermediate temperature shift, medium temperature shift and high temperature shift reactions, methanation, hydrocarbon synthesis by the Fischer-Tropsch reaction, methanol synthesis, ammonia synthesis, ammonia oxidation and nitrous oxide decomposition reactions. The catalyst units may also be used to recover heavy metals such as mercury and arsenic from contaminated gaseous or liquid fluid streams.

Preferred catalytic processes for the present invention are reactions where hydrogen is a reactant and include hydroprocessing including hydrodesulphurisation, hydrogenation, water-gas shift including low-temperature shift, intermediate temperature shift, medium temperature shift and high temperature shift reactions, methanation, hydrocarbon synthesis by the Fischer-Tropsch reaction, methanol synthesis and ammonia synthesis.

Figure 2:
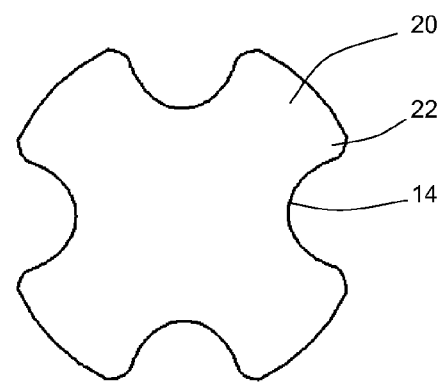
FIG. 2 is an end view showing the top of the catalyst unit of FIG. 1.
Figure 3:
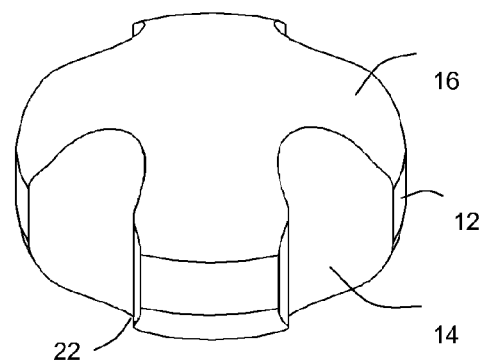
FIG. 3 is an isometric view of the catalyst unit of FIG. 1.

FIGS. 1 and 2 together depict a catalyst unit 10 in the form of a cylinder 12 having a length C and diameter D, which has four flutes 14 along its length, equally-spaced around the circumference of the unit 10. The cylinder 12 has domed ends 16, 18 of lengths A and B, which are elliptical in cross-section. A and B are the same. (A+B+C)/D is about 0.73. (A+B)/C is about 3.0. Looking at FIGS. 2 and 3, the four flutes 14 create four equally sized lobes 20. The flutes are all elliptical in cross section with a width about 0.25 D and a depth about 0.16 D. The edges of the flutes where they form the lobes have a rounded portion 22. The radius of the rounded portion is about 0.05 D.

EXAMPLES

The invention is further illustrated by reference to the following Example.

Example 1

Computer modelling of a series of catalyst units was performed. Examples 1a-f relate to 4-fluted highly domed cylindrical pellets similar to that depicted in FIGS. 1-3. Comparative example X is a standard flat-topped cylindrical catalyst unit currently used. Comparative example Y is highly domed cylindrical pellet without flutes.

Example 2

100 parts of a co-precipitated composition comprising a mixture of Cu and Zn hydroxycarbonates and alumina prepared according to the disclosure of U.S. Pat. No. 4,788,175 was mixed with 2 parts graphite and fed to a rotary tablet press and successfully formed into pellets of shape according to Example 1d.

Although the invention is illustrated and described herein with reference to specific embodiments, the invention is not intended to be limited to the details shown. Rather, various modifications may be made in the details within the scope and range of equivalents of the claims and without departing from the invention.

The invention claimed is:

1. A catalyst unit in the form of a cylindrical pellet having a cylinder length C and diameter D, wherein the exterior surface of the unit has two or more flutes running along its length, said cylinder having domed ends of lengths A and B such that (A+B+C)/D is in the range 0.50 to 2.00, and (A+B)/C is in the range 0.40 to 5.00.

2. A catalyst unit according to claim 1 wherein A and B are the same or different.

3. A catalyst unit according to claim 1 wherein (A+B+C)/D is in the range 0.50 to 1.50.

4. A catalyst unit according to claim 1 wherein (A+B)/C is in the range 0.4 to 3.00.

5. A catalyst unit according to claim 1 wherein the unit has between 3 and 12 flutes running axially along its length.

6. A catalyst unit according to claim 1 wherein the flutes are equally spaced about the circumference of the unit.

|    | A mm | B mm | C mm | D mm | (A + B + C)/D | (A + B)/C | Flute size Width/depth mm | Rounded edge radius mm |
|----|------|------|------|------|---------------|-----------|---------------------------|------------------------|
| X  | 0    | 0    | 5.2  | 5.4  | 0.96          | —         | —                         | —                      |
| Y  | 1.0  | 1.0  | 3.2  | 5.4  | 0.96          | 0.63      | —                         | —                      |
| 1a | 1.5  | 1.5  | 1.0  | 6.0  | 0.67          | 3.0       | 2.0/1.6                   | 0.35                   |
| 1b | 1.0  | 1.0  | 2.0  | 6.0  | 0.67          | 1.0       | 2.0/1.6                   | 0.35                   |
| 1c | 1.5  | 1.5  | 1.0  | 6.0  | 0.67          | 3.0       | 1.8/1.25                  | 0.45                   |
| 1d | 1.0  | 1.0  | 2.0  | 6.0  | 0.67          | 1.0       | 1.8/1.25                  | 0.45                   |
| 1e | 1.0  | 2.0  | 1.0  | 6.0  | 0.67          | 3.0       | 1.8/1.25                  | 0.45                   |
| 1f | 1.0  | 1.5  | 1.5  | 6.0  | 0.67          | 1.67      | 1.8/1.25                  | 0.45                   |

Simulation in reaction vessel under the same conditions gave the following;

|    | Relative GSA $m^2/m^3$ | Relative Voidage | Relative pressure drop |
|----|------------------------|------------------|------------------------|
| X  | 100.0                  | 100.0            | 100.0                  |
| Y  | 93.7                   | 103.1            | 85.4                   |
| 1a | 127.4                  | 136.0            | 50.7                   |
| 1b | 129.7                  | 135.5            | 52.1                   |
| 1c | 117.6                  | 121.3            | 65.8                   |
| 1d | 120.3                  | 119.1            | 71.3                   |
| 1e | 119.9                  | 121.4            | 67.0                   |
| 1f | 118.7                  | 122.9            | 63.9                   |

The results show the catalyst units according to the invention have a higher GSA, better voidage and lower pressure drop than the comparative catalysts.

7. A catalyst unit according to claim 6 wherein the flutes are semicircular, elliptical, U-shaped, V-shaped, Π-shaped or a variant of these.

8. A catalyst unit according to claim 1 wherein the total flute width is ≤35% of the circumference of the unit.

9. A catalyst unit according to claim 1 wherein the flutes have rounded edges.

10. A catalyst unit according to claim 9 wherein the rounded edges have a radius in the range 0.03 D to 0.09 D.

11. A catalyst unit according to claim 1 having between 1 and 12 holes extending therethrough.

12. A catalyst unit according to claim 11 wherein the hole or holes have a circular cross-section and independently have a diameter d' in the range of 0.05 D to 0.5 D.

13. A catalyst unit according to claim 1 wherein one or both domed ends are positioned to provide a lip on one or both ends of the cylinder.

14. A catalyst unit according to claim 1 comprising a metal or metal compound selected from the group consisting of metal oxide, metal hydroxide, metal carbonate, and metal hydroxycarbonate, and mixtures thereof.

15. A catalyst unit according to claim 14 wherein the metal or metal compound comprises one or more metals selected from the group consisting of Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce.

16. A catalyst unit according to claim 1 comprising alumina, titania, zirconia or metal-aluminate, or a mixture thereof.

17. A catalyst unit according to claim 1 containing one or more metal compounds that have been impregnated into and/or deposited on said unit.

18. A catalyst unit according to claim 17 wherein the metal compound comprises one or more metals selected from the group consisting of Na, K, Mg, Ca, Ba, Al, Si, Ti, V, Cr, Mn, Fe, Co, Ni, Cu, Zn, Y, Zr, Nb, Mo, Ru, Rh, Pd, Ag, Sn, Sb, La, Hf, W, Re, Ir, Pt, Au, Pb, and Ce.

19. A method of making a catalyst unit in the form of a cylindrical pellet comprising the steps of (i) feeding a powdered material into a pelleting die, and (ii) compressing the powder to form a shaped unit, said die being shaped such that the catalyst unit is in the form of a cylindrical pellet having a cylinder length C and diameter D, wherein the exterior surface of the unit has two or more flutes running along its length, said cylinder having domed ends of lengths A and B such that (A+B+C)/D is in the range 0.50 to 2.00, and (A+B)/C is in the range 0.40 to 5.00.

20. A method according to claim 19 wherein the powdered material is a precipitated composition comprising one or more catalytic metals, that has been dried and optionally calcined and/or reduced & passivated.

21. A method according to claim 19 wherein the powdered material is a catalyst support material.

22. A method according to claim 21 wherein the method further comprises the step of treating the resulting unit by impregnation or deposition with one or more metal compounds.

23. A catalytic process comprising contacting a reactant mixture with a catalyst unit in the form of a cylindrical pellet having a cylinder length C and diameter D, wherein the exterior surface of the unit has two or more flutes running along its length, said cylinder having domed ends of lengths A and B such that (A+B+C)/D is in the range 0.50 to 2.00, and (A+B)/C is in the range 0.40 to 5.00, under conditions to effect a catalysed reaction.

24. A catalytic process according to claim 23 selected from hydroprocessing including hydrodesulphurisation, hydrogenation, steam reforming including pre-reforming, catalytic steam reforming, autothermal reforming and secondary reforming and reforming processes used for the direct reduction of iron, catalytic partial oxidation, water-gas shift including isothermal-shift, sour shift, low-temperature shift, intermediate temperature shift, medium temperature shift and high temperature shift reactions, methanation, hydrocarbon synthesis by the Fischer-Tropsch reaction, methanol synthesis, ammonia synthesis, ammonia oxidation and nitrous oxide decomposition reactions, or for the recovery of heavy metals from contaminated gaseous or liquid fluid streams.

25. A method according to claim 19 wherein a pelleting aid is included with the powdered material in the pelleting die.

26. A method according to claim 19 further comprising (iii) heating the shaped unit to form the catalyst unit.

* * * * *